United States Patent Office 3,332,923
Patented July 25, 1967

3,332,923
N-VINYL-N'-ACRYLYL UREA
Leslie D. Moore, Lisle, and Rolland P. Brown, Park Forest, Ill., assignors to Nalco Chemical Company, Chicago, Ill., a corporation of Delaware
No Drawing. Filed May 18, 1964, Ser. No. 368,356
9 Claims. (Cl. 260—89.7)

This invention relates to a new and useful vinyl monomer and the process of its manufacture. More specifically, the invention comprises discovery of N-vinyl-N'-acrylyl urea, and the process of its preparation from acrylamide.

Monomers containing two vinyl groups have for many years been of considerable interest to the chemical art. These vinyl compounds have found wide use as crosslinking agents in the polymerization of ethylenically unsaturated addition type monomers. More particularly, these crosslinking additives have found practical application as aids in treating subdivided matter, whereby the matter is bound into cohesive masses having improved resistance to external pressure of all types, whether exerted by human mechanical means or the forces of nature. This method of treating subdivided matter, generally and loosely is described as grouting.

It would be of great benefit to the art if a novel divinyl monomer were discovered which could easily be prepared. It would be of further benefit to the art if the divinyl monomer could efficiently act as a crosslinking agent for ethylenically unsaturated monomers. Particularly, it would be of considerable value to the art if this crosslinking agent would be especially adaptable for use in a grouting process.

It is, therefore, an object of this invention to provide N-vinyl-N'-acrylyl urea, useful as a crosslinking agent for ethylenically unsaturated monomers and an efficient process for its manufacture.

Yet another object of this invention is to provide a process of aggregating naturally occurring particulate matter by contact with a polymerization mixture comprising the above urea, whereby the combination of particulate matter and polymerizable mixture after polymerization has been effected, is converted to a unitary substantially water-impregnable mass of superior strength.

Still another object of the invention is to provide novel polymerization mixtures useful in carrying out the above process of aggregation.

Other objects and advantages of the invention will be apparent to those skilled in the art upon further consideration of the invention discussed in detail hereinbelow.

In accordance with the foregoing objects of this invention, it has been discovered that a novel and useful composition of matter can be prepared from acrylamide. This compound, N-vinyl-N'-acrylyl urea, is produced by the following reaction:

$$2CH_2=CHCONH_2 + MOX \longrightarrow$$

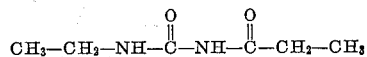

where M is an alkali or alkaline earth metal, O is oxygen and X is a halogen radical.

The product of this invention, when purified, is a very fine white needle-like crystal which melts at 139.5° C. to 140.5° C. The product is unstable in acid, liberating acetaldehyde. It is sparingly soluble in water, and is soluble in dilute caustic, methylene chloride, ethylene chloride, methanol, ethanol, isopropanol and the like.

The chemical formula of N-vinyl-N'-acrylyl urea has been determined by analysis. Using conventional nuclear magnetic resonance analysis techniques, the compound shows only vinyl and NH protons, with the ratio of vinyl to NH protons being 3 to 1. Conventional infra-red analysis shows a vinyl group next to a substituted amide group as well as a vinyl group attached to a nitrogen atom.

The just enumerated evidence of molecular structure is further supported by the following analysis of a derivative of N-vinyl-N'acrylyl urea. The vinyl compound was hydrogenated, using conventional means. Hydrogen, at 50 p.s.i.g. pressure and N-vinyl-N'-acrylyl urea were reacted for 5 minutes, in the presence of a paladium catalyst on a charcoal carrier in an isopropanol solution. The resulting derivative was a completely saturated compound which melted at 95° C. to 97° C. This compound, ethyl propanoxy urea, is known in the literature, and its derivation is substantiated as outlined below.

Nuclear magnetic resonance analysis of the just named derivative showed 2 $CH_3$ groups in slightly different environments. Also shown were 1 $CH_2$ group next to a $C=O$ group and 1 $CH_2$ group next to an NH group. Both $CH_2$ groups were found to be next to $CH_3$ groups, and it was shown that there are 2 NH groups in different environments. The ratio of aliphatic protons to NH protons is 5 to 1. Infra-red analysis shows the presence of a mono-substituted amide and carbonyl groups. The resulting hydrogenated derivative, therefore, is calculated to have the formula:

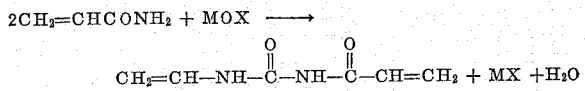

The above stated analytical evidence is believed to completely verify chemical existence of N-vinyl-N'-acrylyl urea.

It has been discovered that there is a convenient procedure for preparing the compound of the invention. Essentially, this process consists of reacting acrylamide in solution with a compound of the general formula MOX as previously defined, while maintaining the pH of the resulting mixture during reaction above 7.0 and maintaining the temperature at less than the decomposition temperature of the final product.

Various solvents may be used in the process of this invention with the only requirement being that both the acrylamide and the reactant MOX be soluble in the solvent employed. Examples of solvents which are useful are water, polar organics such as alcohols, ketones, and the like and mixture of water and water compatible polar organic solvents. Water and mixtures of water and water compatible polar organics where water is the major portion of the solvent system are preferred, with water being most preferred as a solvent.

With respect to the MOX reactant, sodium, potassium and lithium are preferred alkali metals, while calcium, barium and magnesium are preferred alkaline earth metals. Sodium is the most preferred alkali metal. Examples of suitable halogen radicals are chlorine, bromine and iodine of which chlorine is the most preferred.

It has been discovered that certain requirements must be placed upon the stoichiometric amounts of the reactants. It has been found that at least ½ mole of MOX should be reacted with each mole of acrylamide. It is more preferred to have an excess of MOX present, that is, in excess of ½ mole of MOX per mole of acrylamide. It is most preferred to have a 1 to 1 starting molar ratio of these two reactants.

Another important feature of the process of this invention is the temperature range at which the process is operative. When slightly moist, n-vinyl-N'-acrylyl urea decomposes at its melting point and, as more water is added, the decomposition temperature becomes lower. The reaction temperature should therefore be maintained below the decomposition temperature of this product compound. It is more preferred to maintain the temperature below 75° C., and it is most preferred to maintain the temperature below 50° C. It has been found that the minimum temperature at which the process is operable is the lowest temperature that the mixture will exist in solution without freezing. It has been found, however, that as a practical matter this minimum temperature is never reached, even with extensive cooling. The reaction runs smoothly without interruption by reason of freezing, over a wide range of lower temperatures.

A very important variable in the process of this invention is the pH range at which the reaction is carried out. It has been discovered that at all times during the reaction the pH must be maintaind above 7.0. If the pH is allowed to go below 7.0, product decomposition occurs and an undesirable product quite unlike the product of this invention is formed.

In most cases, the initial pH of the acrylamide-MOX solution is much higher than 7.0, and, in fact, this initial pH will generally range from 8.0 to 12.0 or higher. However, it is preferred to adjust the pH to about 11–12 initially to insure that the final pH will remain above 7.0. As mentioned above, other products are formed at pH's not much below 7.0, and these products are not within the scope of this invention.

Generally, the time necessary to form the product of this invention ranges from 30 minutes to 2 hours. The rate of this reaction follows the general trend in that it will proceed faster at a higher temperature. The reaction is considered complete when the reactant compound MOX has been used up. A convenient test to determine whether the reaction is complete, is as follows: a small amount of the reacting solution is withdrawn from the reaction vessel and placed in a small amount of solution of potassium iodide. When the resulting test solution no longer oxidizes the potassium iodide to liberate iodine, the reaction is considered complete.

The following is presented by way of example to illustrate features of the above described process.

EXAMPLE I 500 grams of "Clorox" (5.25% NaOCl in water) and grams of acrylamide were mixed together in a reaction flask. The pH of the starting material was adjusted to 11.5 with sodium hydroxide, and the temperature was maintained at 0° C. After the acrylamide had dissolved in the NaOCl solution, stirring was continued until the yellow color disappeared. At this point, the solution was colorless and basic, and oxidized potassium iodide, liberating iodine. After the solution had become colorless, the temperature was allowed to rise. At approximately 15° C. to 20° C., the pH began to fall and after about 45 minutes, the pH was approximately 8.5. At this point, a white precipitate began to form. The reaction was considered complete when the solution no longer oxidized potassium iodide to release iodine. The pH was then adjusted to 8.0 with sodium hydroxide to precipitate a crystal product, N-vinyl-N'-acrylyl urea.

A further embodiment of the invention relates to the formation of crosslinked polymers. In the polymerization of ethylenically unsaturated addition type polymers, the addition or inclusion of minor amounts, usually less than 1%, of a multivinyl compound leads to a structure wherein the polymeric structure is crosslinked. Such crosslinked polymers possess considerable strength and durability and have many applications in the chemical art.

Generally, such systems consist of a crosslinking agent, monomer or monomers, and a catalyst. It has been discovered that N-vinyl-N'-arcylyl urea can successfully be used as a crosslinking agent in the polymerization of many monomers.

Almost any type of hydrophilic water-soluble ethylenically unsaturated monomer may be crosslinked by N-vinyl-N'-acrylyl urea. Among these are acrylamide, acrylic acid, alkyl esters of acrylic acid such as methyl acrylate, etc., salts of acrylic acid and particularly alkaline earth and alkali metal salts such as sodium acrylate, magnesium acrylate, etc., as well as diethylamine acrylate. Likewise, compounds such as acrolein, methacrylic acid, maleic acid and derivatives thereof, such as esters, salts, etc. vinyl sulfonic and vinyl phosphonic acids may be used. Other compounds include trimethylamine methacrylate, diethyl methylene succinate, methyl isopropenyl ketone, ethyl vinyl ketone, vinyl acetate, vinyl pyrrolidone, allyl alcohol, sulfonated styrene, vinyl pyridine, maleic anhydride, sodium maleate, N-allyl amines, vinyl sulfonic salts, allyl amines and various other ethylenically unsaturated compounds having a wide variety of hydrophilic radicals.

Another necessary ingredient in the polymerizable mixture is a catalyst. Both a single catalyst such as conventional free-radical producing compounds including water-soluble oxygen containing catalysts, e.g., ammonium, potassium and sodium persulfate, hydrogen peroxide, the alkali metal and ammonium perchlorates, etc., may be used as well as the known 2-component redox catalyst system. In the latter system, water soluble peroxy catalysts such as persulfuric, perboric, perchloric and permanganic acids as well as their salts may be suitably employed as oxidizing components. Particularly, ammonium, potassium and sodium persulfates, hydrogen peroxide, and the alkali metal and ammonium perchlorates may be used as oxidizing reagents. As the reducing component silver nitrate, nitrilotrispropionamide, sodium thisulfate, sodium or potassium bisulfite, thiosulfate, or metabisulfate may be used.

The use of N-vinyl-N'-acrylyl urea as a crosslinking agent in the above described polymerizable mixture is limited to those polymerizations which meet the following two necessary requirements. First, care must be taken to maintain the pH of the mixture above 7.0 once the novel crosslinking agent has been added. As mentioned hereinabove, the product is unstable in acid, and may decompose or otherwise change in an acid pH. Secondly, it is important that the polymerization temperature be less than 75° C. and most preferred that the temperature be maintained below 50° C.

Still another embodiment of the invention relates specifically to the formation of crosslinked polymers and copolymers of acrylamide. It has been discovered that it is possible to effect the formation of the N-vinyl-N'-acrylyl urea in situ, followed by the subsequent polymerization of the unreacted acrylamide and comonomers. Again, the only limitation is that the pH be maintained above 7.0 and the temperature be maintained below that of the decomposition temperature.

Yet another embodiment of this invention is the inclusion of a polymerizable mixture described hereinabove with an amount of some particulate matter such as sand, soils and the like. Any of the various methods and refinements known to those skilled in the grouting art may be used successfully in this invention. Here again, however, the only limitation to the use of N-vinyl-N'-acrylyl urea is that the pH and temperature be maintained as above stated.

Particulate matter which may be treated may be selected from a wide variety of inorganic and organic substances, synthetic and naturally occurring. By the term "particulate matter" is meant any substance in a subdivided state or existing as fine particles. Among the types of materials which may be solidified by the process are soils, clays, heavy fluid muds, sand, crushed granite, cement, silts, loams, peat, organic matter and inorganic matter in a particulate state such as humus, siliceous compounds, etc. For example when soils are treated, whether they be top soil or subterranean formations, the agglomerates formed by polymerization of the above defined polymerizable mix in the presence of the soil, help to improve aeration, moisture retention, tilth, porosity, water absorption, etc.

The following example, given by way of illustration, shows the crosslinking properties of N-vinyl-N'-acrylyl urea.

EXAMPLE II

This example illustrates a continuous process including an in situ formation of N-vinyl-N'-acrylyl urea and its subsequent use as a crosslinking agent for excess acrylamide present. Acrylamide was added to a solution of NaOCl in water to form a reaction mixture and subsequently reacted to synthesize the urea crosslinker. The pH of the mixture was maintained above 7.0 throughout this reaction, and the reaction temperature was kept at approximately room temperature. After an aliquot sample of the mixture was tested and no longer oxidized potassium iodide to liberate iodine, the mixture was polymerized by addition of catalytic amounts of dimethylaminopropionitrile and ammonium persulfate. 1½ hours after polymerization was initiated, the mixture had gelled.

A test was used in order to determine the efficiency of the polymerizable mixture of the invention as compared to known polymerization mixtures.

This test involved the use of a cone penetrometer. This instrument, known as a "Precision Penetrometer" manufactured by Precision Scientific Company has a stylus attached to the surface of a cone, and is used to test the resiliency, flexibility and strength of formed polymerization gels. The stylus and cone are allowed to drop upon a measured volume of gel and the strength thereof is directly shown on a scale according to the resistance offered to the stylus and cone by the gel. The particular model used was a model number K-3 which is graduated in $7/10$ millimeter divisions. The greater the strength of the gel and resistance to lowered force of cone and stylus, the lower the reading on the Penetrometer Scale.

The penetration of the polymerized gel described in Example II above was taken after 1½ hours with the penetrometer above described. This reading was 130. A similar test was made, using a known crosslinking agent, methylenebisacrylamide in place of the compound of this invention, and a penetration of 160 was obtained. Thus, is can be seen that the crosslinking agent of the invention promotes a stronger gel than did the above well-known currently available prior art material. Other tests which included the agglomeration of particulate matter such as sand and ground coral likewise proved the effectiveness of N-vinyl-N'-acrylyl urea as a crosslinking agent.

N-vinyl-N'-acrylyl urea may also be useful as a chemical intermediate and in a variety of other applications. As an example, the compound of the invention may be used as a herbicide in the eradication of undesirable plants, weeds or other vegetable species. The compound of this invention may be used alone or in combination with other herbicides.

The invention is hereby claimed as follows:

1. N-vinyl-N'-acrylyl urea.
2. A process for the preparation of N-vinyl-N'-acrylyl urea which comprises the steps of forming a reaction mass by solubilizing reactants comprising acrylamide and a hypohalite having the general formula MOX, where M is selected from the group consisting of alkali metals and alkaline earth metals, O is oxygen and X is a halogen radical, said reactants being present in a molar ratio of at least ½ mole of MOX per mole of acrylamide, and allowing the reaction to proceed at a temperature ranging from above the freezing temperature of the reaction mass to less than the decomposition temperature of said urea product, while simultaneously maintaining the pH of the reaction mass above about 7.0.
3. The process of claim 2 where M is sodium and X is chlorine.
4. A process for the preparation of N-vinyl-N'-acrylyl urea which comprises the steps of forming a reaction solution by solubilizing reactants comprising acrylamide and a hypohalite having the general formula MOX, where M is selected from the group consisting of alkali metals and alkaline earth metals, O is oxygen and X is a halogen radical, said reactants being present in a molar ratio of at least ½ mole of MOX per mole of acrylamide, and allowing the reaction to proceed for a sufficient time until said reaction solution no longer oxidizes potassium iodide to liberate iodine, while simultaneously mantaining the temperature during the whole of said reaction within a range of from above the freezing temperature of the reaction solution to less than 75° C., and maintaining the pH of the reaction solution above 7.0.
5. The process of claim 4 where the temperature of the reaction solution is maintained below 50° C.
6. The process of claim 4 where M is sodium and X is chlorine.
7. In a process for the formation of a solid, crosslinked polymer of an addition type ethylenically unsaturated monomer, the steps comprising addition to a solution of said monomer of at least a crosslinking amount of N-vinyl-N'-acrylyl urea to form a polymerizable solution and subsequently polymerizing said solution while maintaining the pH of said solution above 7.0 and the temperature below 75° C. in the presence of a catalytic amount of a free radical producing compound.
8. The process of claim 7 where the addition type ethylenically unsaturated monomer is acrylamide.
9. A process of aggregating particulate matter to produce exceptionally high strength agglomerates thereof, which comprises the steps of contacting said matter in the presence of water with a polymerizable mixture comprising at least one water-soluble ethylenically unsaturated monomer, at least a cross-linking amount of N-vinyl-N'-acrylyl urea and a free radical catalyst, and effecting polymerization of said mixture in the presence of said particulate matter at a pH greater than 7.0 and at a temperature less than 75° C., whereby said matter and said mixtures are converted to a substantially water-impermeable mass of superior strength.

No references cited.

JOSEPH L. SCHOFER, *Primary Examiner.*

H. I. CANTOR, *Assistant Examiner.*